Feb. 21, 1928.
H. M. CHAUNCEY
STEAM COOKER
Filed April 20. 1926
1,659,721
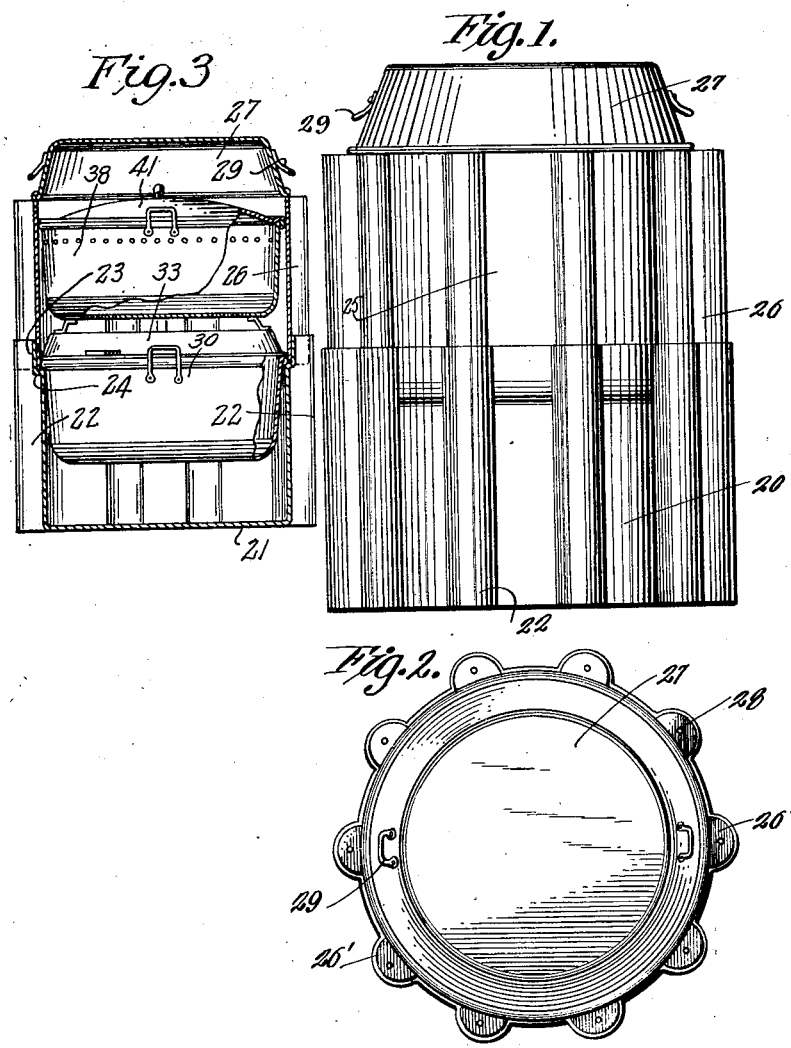
WITNESSES
INVENTOR.
HATTIE M. CHAUNCEY
BY
ATTORNEY.

Patented Feb. 21, 1928.

1,659,721

UNITED STATES PATENT OFFICE.

HATTIE MOON CHAUNCEY, OF CHATTANOOGA, TENNESSEE.

STEAM COOKER.

Application filed April 20, 1926. Serial No. 103,368.

The present invention relates to improvements in cooking utensils and has particular reference to a novel steam cooker.

An important object of the invention is to provide means whereby several commodities may be properly cooked at the same time.

Still another object of the invention is the provision of a utensil of the above type for cooking or steaming vegetables, fruits, meats and the like, simultaneously.

A still further object of the invention is the provision of a steamer of comparatively simple and durable construction designed for efficient operation and which may be manufactured at a relatively low cost.

Other objects and advantages of the invention will become apparent as the description progresses.

In the accompanying drawings forming a part of this specification and in which like reference characters are employed to designate corresponding parts throughout the same:

Figure 1 is a side elevational view of my improved cooking utensil in assembled operative position, Figure 2 is a top plan view of the same, Figure 3 is a vertical transverse sectional view of the present cooking utensil showing the method of placing cooking vessels therein.

Referring to the drawings, wherein for the purpose of illustration is shown the preferred embodiment of my invention, it will be seen that my improved steamer embodies the provision of an outer casing preferably composed, as illustrated in Figures 1 and 3, of a pair of complementary sections. This casing embodies a base section designated by the numeral 20 of generally cylindrical formation enclosed at its lower end by a bottom plate 21 and open at its upper end. An important characteristic of the present casing construction is the formation of a plurality of vertically extending uniformly spaced corrugations 22 preferably of semi-circular formation projecting outwardly and extending the entire length of each section. The upper portion of the base section 20 is offset or expanded as at 23 forming an annular shoulder 24 adjacent to but slightly below the upper open edge.

Arranged so as to be slidably fitted in the upper open end of the base section 20 is an upper complementary section 25 formed similarly to the base section although of slightly increased diameter so as to rest upon the shoulder 24 formed on the base section. This upper section 25 is also provided with corrugations 26 adapted to be telescopically fitted in the corrugations 22 formed on the base section.

From the foregoing description and the drawings, it is apparent that my improved steamer casing is preferably formed of a pair of detachable sections arranged in superimposed positions so as to support a plurality of cooking vessels to permit the simultaneous steaming of various commodities. In this connection it will be noted, that it is possible to utilize only the lower base section when desirable, an effective steamer being produced in this application of the structure when it is intended to employ only one cooking vessel. When employing both casing sections in the application of the steamer, the upper end of the casing is enclosed by means of a pan 27 arranged in inverted position on the upper edge of the upper section as shown to advantage in Figures 1 and 3. The outwardly projecting corrugations 26 of this upper section are, however, covered by semi-circular top plates 26' provided at their centers with comparatively small apertures 28, the purpose of which will become apparent as the description progresses. The cover pan 27 is provided with oppositely disposed handles 29 permitting convenient removal of the cover from the casing.

In use, a suitable amount of water is placed in the base section of the steamer casing and the assembled device positioned over a burner or other suitable source of heat. Steam is generated from the water and rises through the casing, heating the vessels mounted therein and cooking the contents. The corrugations formed in the casing sections will facilitate the action of the steam so as to increase the effectiveness thereof, and strengthen the structure. An excessive steam pressure is avoided by the provision of the apertures 28 formed in the upper ends of the corrugations, these apertures providing steam vents through which the steam is permitted to escape. In this manner, a number of different commodities may be cooked in the vessels and compartments formed therein, simultaneously for an entire meal.

It is to be understood that the form of my invention herewith shown and described is to be taken as the preferred example of the same, and that various changes as to the shape and size may be resorted to without departing from the spirit of the invention or the scope of the subjoined claims.

Having thus described my invention, I claim:

1. A cooking vessel of the character described, wherein the wall thereof is provided with a plurality of relatively deep corrugations extending from the top edge of the wall to the bottom thereof, and opening into the vessel, said corrugations being open at their upper ends, and having the lower ends closed by the bottom of the vessel extending thereacross and formed integral therewith, said vessel having a relatively narrow portion of the wall at the top edge thereof of slightly greater diameter to set up an annular flange designed to support another utensil within the vessel but leaving the corrugations open at the top.

2. A cooker of the character comprising, in combination, a base receptacle having a bottom and side wall, and having said side wall provided with a plurality of outwardly pressed relatively deep corrugations extending from the top edge of the wall to the bottom thereof and opening into the receptacle, said corrugations being closed at their lower ends, said wall having a portion of the top thereof of greater diameter than the remainder of the receptacle and an upper complementary section comprising an annular body open top and bottom and having outstruck corrugations formed therein and extending from the top to the bottom edge thereof, said body being of a diameter to fit within the enlarged upper portion of said receptacle and the corrugations of said body being of such diameter as to permit their insertion into the upper ends of the corrugations of the receptacle therebeneath.

In testimony whereof I affix my signature.

HATTIE MOON CHAUNCEY.